United States Patent
Takahashi

(10) Patent No.: US 9,507,194 B2
(45) Date of Patent: Nov. 29, 2016

(54) DISPLAY APPARATUS

(71) Applicant: CANON KABUSHIKI KAISHA, Tokyo (JP)

(72) Inventor: Yutaro Takahashi, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 14/531,105

(22) Filed: Nov. 3, 2014

(65) Prior Publication Data

US 2015/0124192 A1    May 7, 2015

(30) Foreign Application Priority Data

Nov. 6, 2013   (JP) .................. 2013-230438

(51) Int. Cl.
*G02F 1/1333* (2006.01)
*G09G 3/36* (2006.01)

(52) U.S. Cl.
CPC ....... *G02F 1/133308* (2013.01); *G09G 3/3611* (2013.01); *G02F 2001/133322* (2013.01); *G02F 2201/503* (2013.01); *G09G 2320/0626* (2013.01); *G09G 2320/0693* (2013.01); *G09G 2340/0492* (2013.01); *G09G 2360/145* (2013.01)

(58) Field of Classification Search
CPC ............. G09G 2320/0693; G09G 2320/0626; G02F 2001/133322
See application file for complete search history.

(56) References Cited

U.S. PATENT DOCUMENTS

| 8,860,656 | B1 * | 10/2014 | Cho | G06F 3/041 345/1.1 |
|---|---|---|---|---|
| 2005/0105012 | A1 * | 5/2005 | Kim | G02F 1/133308 349/58 |
| 2008/0231930 | A1 * | 9/2008 | Mizoguchi | G02B 26/085 359/224.1 |
| 2009/0298547 | A1 * | 12/2009 | Kim | H04W 52/027 455/566 |
| 2011/0285926 | A1 * | 11/2011 | Yokote | G06F 1/1601 348/841 |
| 2013/0201127 | A1 | 8/2013 | Abe et al. | |
| 2014/0160040 | A1 * | 6/2014 | Kang | H04R 17/005 345/173 |
| 2014/0184957 | A1 * | 7/2014 | Satou | G06F 1/169 349/12 |
| 2014/0241558 | A1 * | 8/2014 | Yliaho | H04R 5/02 381/333 |
| 2015/0086063 | A1 * | 3/2015 | Louh | H04R 1/028 381/388 |
| 2015/0116454 | A1 * | 4/2015 | Kim | G03H 1/0486 348/40 |
| 2015/0206482 | A1 * | 7/2015 | Ito | G09F 13/005 345/207 |
| 2016/0034057 | A1 * | 2/2016 | Ikeda | H04M 1/03 345/173 |

FOREIGN PATENT DOCUMENTS

JP    2010-204357 A    9/2010
JP    2012-010413 A    1/2012

* cited by examiner

*Primary Examiner* — Sang V Nguyen
(74) *Attorney, Agent, or Firm* — Fitzpatrick, Cella, Harper & Scinto

(57) ABSTRACT

A display apparatus includes: a display panel; a panel holder having a supporting portion that makes contact with an end surface of a lower side of the display panel so as to support the display panel; and a vibrating unit provided under the supporting portion so as to apply vibration to a portion, which is in contact with the supporting portion, of the end surface of the lower side of the display panel. A method of controlling the display apparatus includes: controlling the vibrating unit; and determining whether a predetermined condition is satisfied, wherein the controlling involves causing the vibrating unit to vibrate when the predetermined condition is satisfied.

20 Claims, 13 Drawing Sheets

DISPLAY APPARATUS

BACKGROUND OF THE INVENTION

Field of the Invention

The present invention relates to a display apparatus.

Description of the Related Art

A conventional liquid crystal display apparatus includes a liquid crystal panel and a backlight unit that illuminates the liquid crystal panel.

FIG. 11 illustrates an inner structure of a liquid crystal panel.

A liquid crystal panel 20 in a liquid crystal display apparatus includes two main components which are a liquid crystal cell 29 and an optical film 21 that protects both surfaces of the liquid crystal cell 29. The liquid crystal cell 29 has a configuration in which a space as narrow as approximately several μm between two glass substrates 22 having a thickness of 0.4 mm to 0.7 mm is held by spacers 24 and is filled with liquid crystals 23 having a long planar structure. A color filter substrate 25 is provided on a display surface side of the two glass substrates 22 and an array substrate 26 is provided on a backlight side. The color filter substrate 25 has a configuration in which three pixels of the colors red (R), green (G), and blue (B) and black matrix of light blocking portions spaced from the pixels are formed on a glass substrate. The array substrate 26 is a substrate that has an electric circuit function of driving the liquid crystals 23.

The optical film 21 is a pair of polarizing plates attached to both sides of the liquid crystal cell 29, which are configured such that polarizing directions thereof are generally orthogonal to each other so that light beams incident only in a certain direction can pass through the film. The optical film 21 illustrated in FIG. 11 is configured such that incident light beams 27 pass therethrough and appear as output light beams 28 on the display surface side if an orientation of the liquid crystals 23 is vertical to the glass substrate 22. The incident light beams 27 are blocked if the orientation of the liquid crystals 23 is parallel to the glass substrate 22.

A gradation of images displayed by a liquid crystal display apparatus is determined mainly by the direction of an orientation of the liquid crystals 23, and the orientation of the liquid crystals 23 is controlled by a voltage applied by the array substrate 26. The voltage applied is controlled such that all incident light beams 27 are allowed to pass through the film when a white image having a highest gradation is displayed and all incident light beams 27 are blocked when a black image having a lowest gradation is displayed.

Next, a method of manufacturing the liquid crystal panel will be described.

The glass substrate 22 that constitutes the liquid crystal panel is obtained by cutting a large mother glass substrate. Since the substrate is cut by scribing and breaking the same using a diamond cutter, the end surface of the glass substrate 22 has burrs. Thus, the end portion of the glass substrate 22 has such a shape that the end portion is easily hooked at something, and is often hooked at a holding member that holds the liquid crystal panel.

In particular, when the liquid crystal panel 20 itself is pressed and strong vibration is applied thereto so that the end portion is hooked at a holding member, stress is generated and this stress is not removed unless the end portion is unhooked. In a state where stress is applied to the liquid crystal panel, image quality deterioration such as display unevenness occurs. In order to obviate this deterioration, a structure of temporarily reducing the stress applied to the liquid crystal panel is proposed (see Japanese Patent Application Publication No. 2010-204357).

SUMMARY OF THE INVENTION

When the liquid crystal panel 20 receives stress, the orientation of the liquid crystals 23 is disordered forcibly and it becomes difficult to perform highly accurate orientation control implemented by voltage application. Here, an inner structure of the liquid crystal panel when the liquid crystal panel 20 receives stress will be described in detail.

FIG. 12 illustrates the inner structure of a liquid crystal panel when a black image is displayed with no stress applied and FIG. 13 illustrates the inner structure of a liquid crystal panel when a black image is displayed with stress applied.

It is assumed that the liquid crystal display apparatus has a configuration in which, in a state where stress is not applied, as illustrated in FIG. 12, liquid crystal molecules are parallel to the incident light beams and the incident light beams 27 are blocked. In a state where stress is applied, as illustrated in FIG. 13, the spacers 24 holding the space of the liquid crystals 23 are compressed due to stress, and the distance of the space holding the liquid crystals 23 changes from D to d (D>d). Due to this, the orientation of the liquid crystals 23 cannot maintain the parallel direction and is misaligned. Thus, it is not possible to block the incident light beams 27 sufficiently.

When static pressure or impact is applied directly into the display area of the liquid crystal panel 20, stress is often applied to a local area of the entire screen, and misalignment of the orientation of the liquid crystals 23 occurs in a local area.

Due to this, the incident light beams 27 pass through only a local area where stress is applied and are blocked in other areas, the brightness increases in a partial area although a black image is displayed on the entire screen, and brightness uniformity of the screen decreases. Hereinafter, a decrease in the brightness uniformity of the screen is referred to as brightness unevenness.

Liquid crystal display apparatuses are classified into a normally white liquid crystal display apparatus in which the transmittance of incident light beams reaches its maximum when no voltage is applied to display a white image and a normally black liquid crystal display apparatus in which the transmittance reaches its minimum when a voltage is not applied to display a black image. In a white display state of the normally white liquid crystal display apparatus and a black display state of the normally black liquid crystal display apparatus, control of the orientation of the liquid crystals 23 according to an applied voltage is not performed and an image of the same brightness is displayed on the entire screen. Thus, brightness unevenness is easily noticed.

The present invention provides a liquid crystal display apparatus having a structure in which a liquid crystal panel is held by a panel holder, capable of suppressing a state where stress is applied to the liquid crystal panel to thereby suppress brightness unevenness.

A first aspect of the present invention provides a display apparatus including: a display panel; a panel holder having a supporting portion that makes contact with an end surface of a lower side of the display panel so as to support the display panel; and a vibrating unit provided under the supporting portion so as to apply vibration to a portion, which is in contact with the supporting portion, of the end surface of the lower side of the display panel.

A second aspect of the present invention provides a method of controlling a display apparatus including: a display panel; a panel holder having a supporting portion that makes contact with an end surface of a lower side of the display panel so as to support the display panel; and a vibrating unit provided under the supporting portion so as to apply vibration to a portion, which is in contact with the supporting portion, of the end surface of the lower side of the display panel, the method including: controlling the vibrating unit; and determining whether a predetermined condition is satisfied, wherein the controlling involves causing the vibrating unit to vibrate when the predetermined condition is satisfied.

According to the present invention, it is possible to provide a liquid crystal display apparatus having a structure in which a liquid crystal panel is held by a panel holder, capable of suppressing a state where stress is applied to the liquid crystal panel to thereby suppress brightness unevenness.

Further features of the present invention will become apparent from the following description of exemplary embodiments (with reference to the attached drawings).

DESCRIPTION OF THE EMBODIMENTS (First Embodiment)

Hereinafter, a first embodiment of the present invention will be described.

Figure 1:
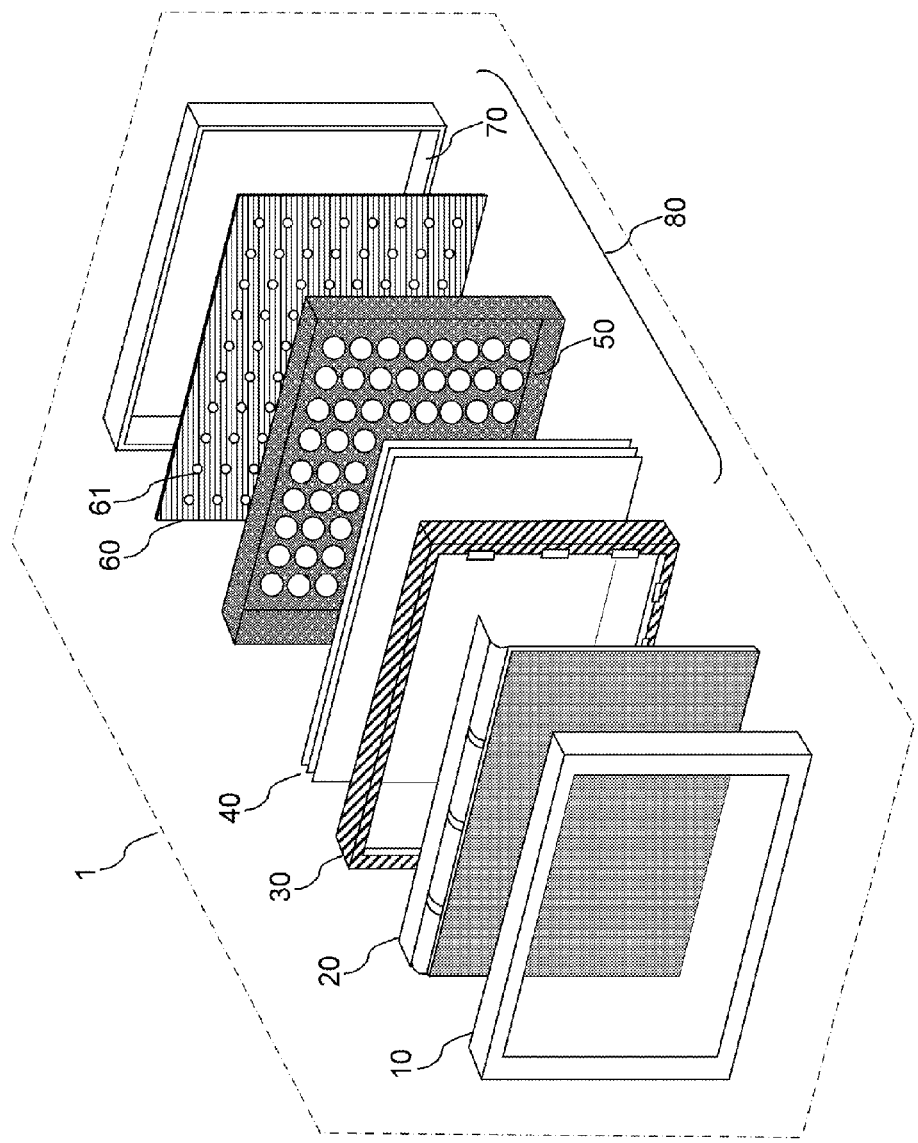
FIG. 1 is an exploded perspective view of an entire liquid crystal display apparatus according to a first embodiment.

FIG. 1 is an exploded perspective view of an entire liquid crystal display apparatus 1 according to an embodiment of the present invention.

A liquid crystal display apparatus 1 includes a frame 10, a liquid crystal panel 20, a panel holder 30, an optical sheet 40, a reflecting sheet 50, a substrate 60, and a casing 70. The panel holder 30 is made from a resin and holds and accommodates the liquid crystal panel 20 so as to maintain certain space from the optical sheet 40. In the present embodiment, although a configuration in which the display apparatus includes a transmissive liquid crystal panel as a display panel is described as an example, the present invention is not limited to a liquid crystal display apparatus having a transmissive liquid crystal panel. The display apparatus may be a reflective liquid crystal display apparatus. Moreover, the display apparatus may be a micro electro mechanical system (MEMS) shutter-type display which uses MEMS shutters instead of liquid crystal devices.

The optical sheet 40 diffuses light from the backlight unit 80. The reflecting sheet 50 reflects light from a light source 61. The light source 61 such as light emitting diodes (LED) or a cold cathode fluorescent lamp (CCFL) is mounted on the substrate 60. The casing 70 accommodates the optical sheet 40, the reflecting sheet 50, and the substrate 60. The panel holder 30, the optical sheet 40, the reflecting sheet 50, the substrate 60, and the casing 70 form a backlight unit 80, and the liquid crystal panel 20 is illuminated by the backlight unit 80.

Figure 2:
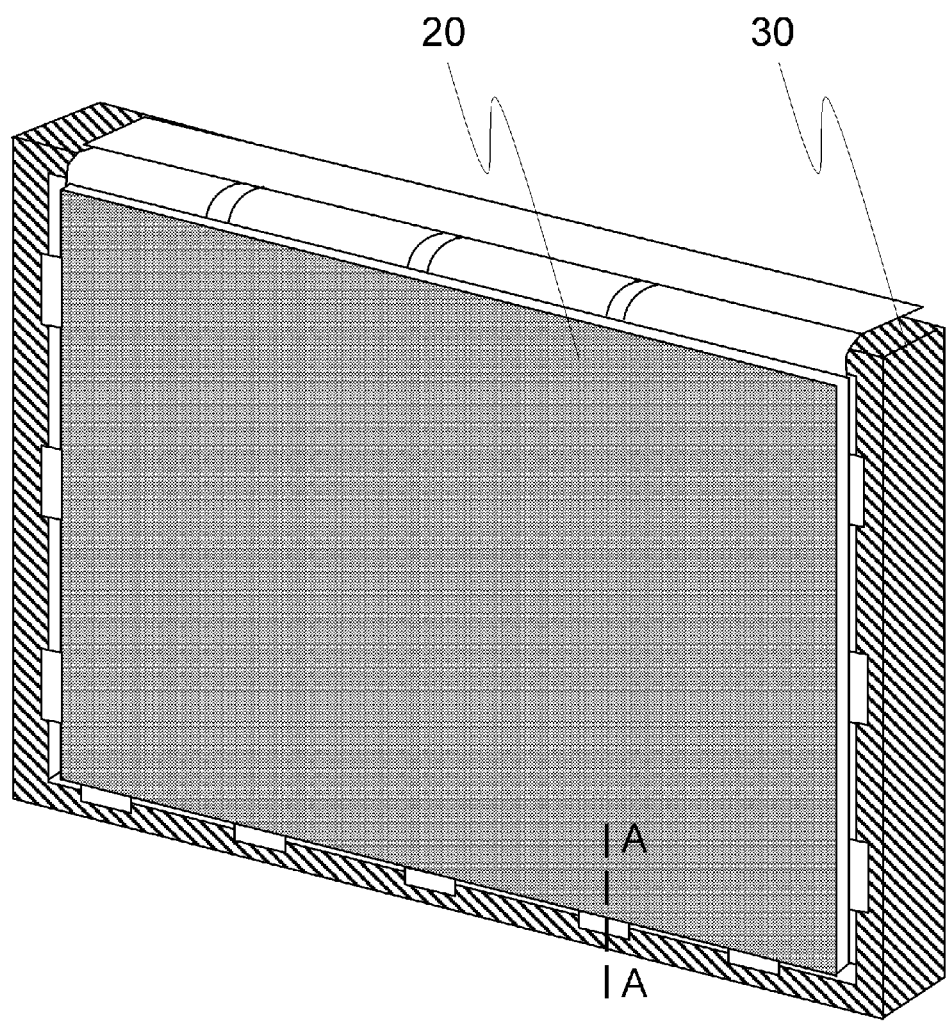
FIG. 2 is a perspective view illustrating a state where the liquid crystal panel according to the first embodiment is incorporated into a backlight unit.
Figure 3:
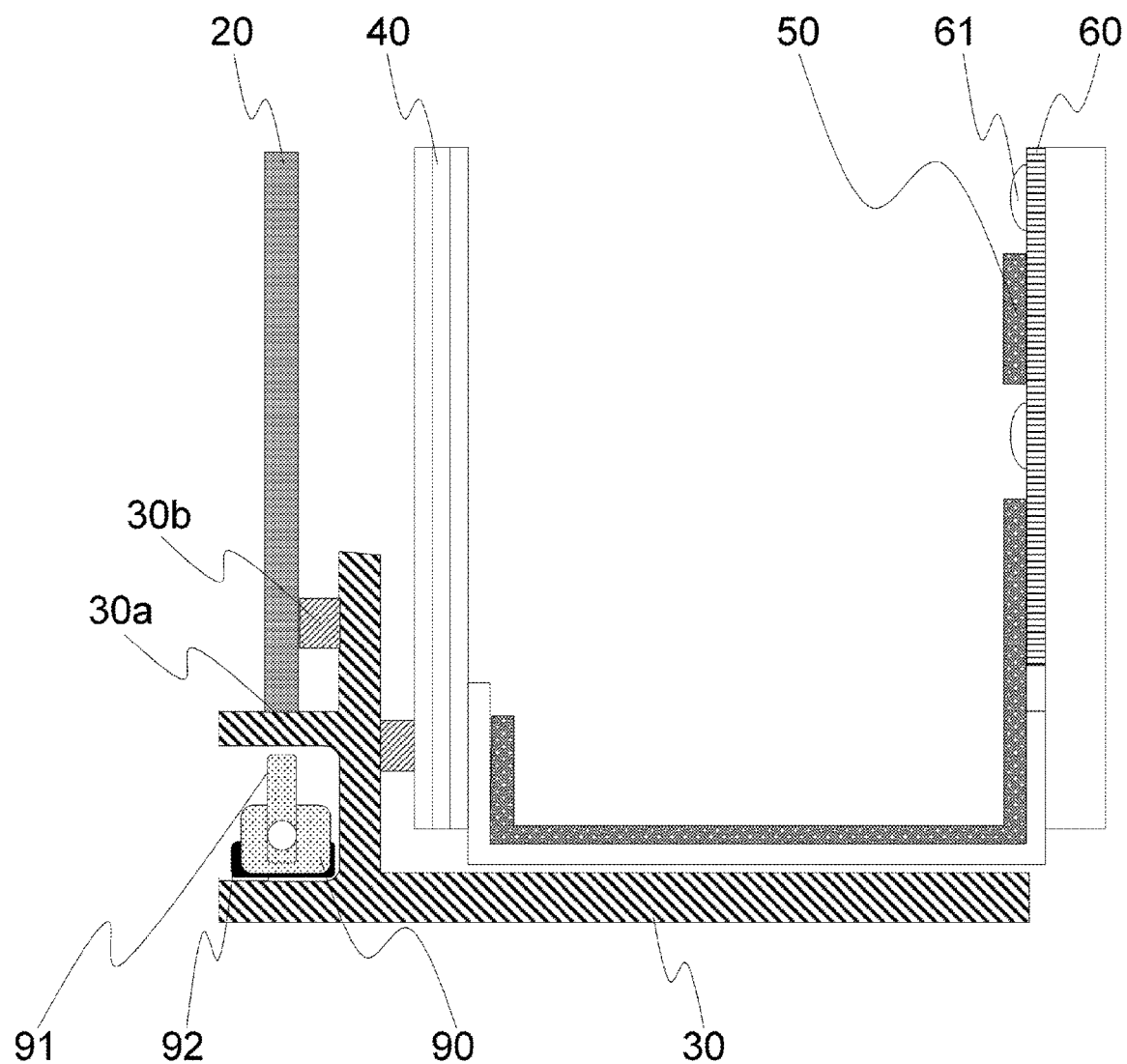
FIG. 3 is a cross-sectional view along line A-A in FIG. 2 of the first embodiment.
Figure 4:
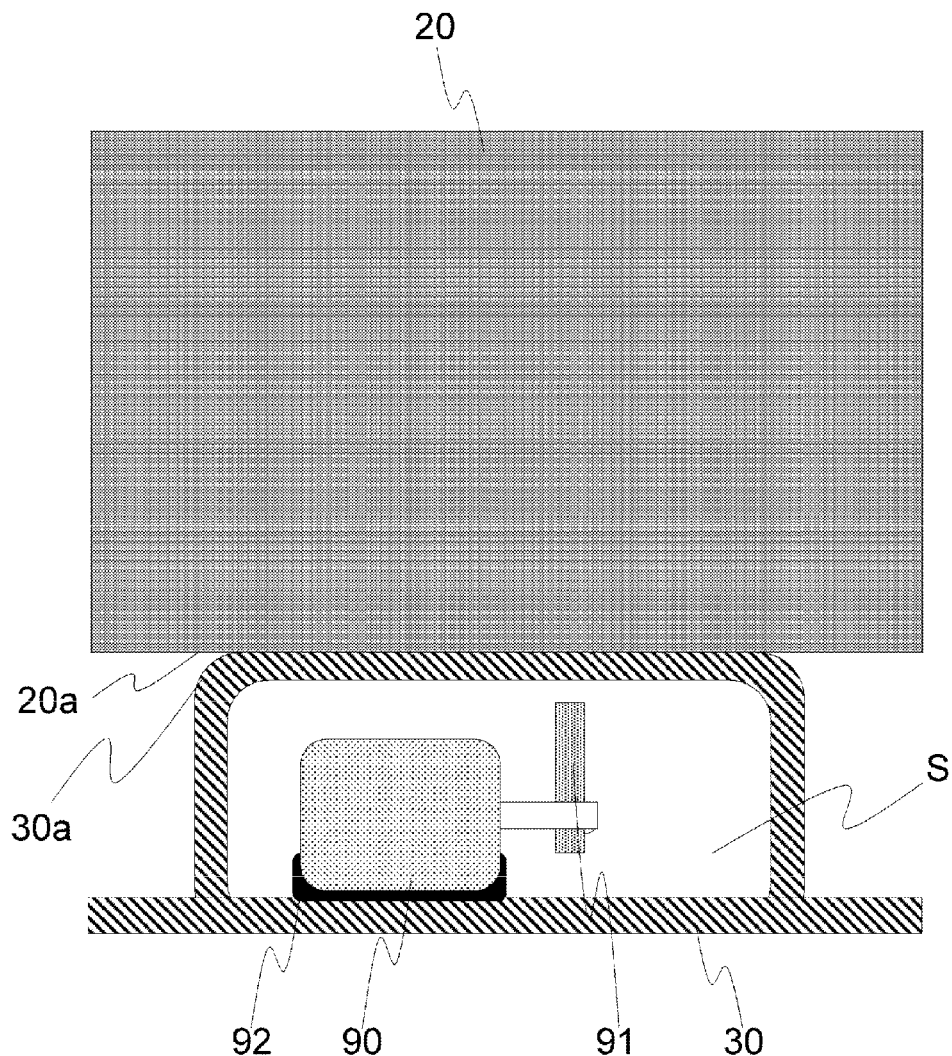
FIG. 4 is a detailed view when a panel supporting portion of the first embodiment is seen from the front side.

FIG. 2 is a perspective view illustrating a state where the liquid crystal panel 20 of the liquid crystal display apparatus 1 is incorporated into the backlight unit 80, FIG. 3 is a cross-sectional view along line A-A in FIG. 2, and FIG. 4 is a detailed view when a panel supporting portion illustrated in FIG. 3 is seen from the front side.

As illustrated in FIGS. 2 and 3, the liquid crystal panel 20 is in contact with a supporting portion 30a of the panel holder 30 so that the own weight thereof is supported, and a rear surface thereof is held by an elastic member 30b which is a holding member (shock absorbing member). This supporting structure is provided on other sides than the lower side of the liquid crystal panel 20. In the respective sides, the entire side or a portion of the side of the liquid crystal panel 20 may be in contact with the panel holder 30.

As illustrated in FIGS. 2 and 3, a space S is provided under the supporting portion 30a of the lower side of the panel holder 30 supporting the liquid crystal panel 20. A vibrating unit including a motor 90 and a vibrator 91 that converts driving force of the motor 90 into vibration is disposed inside the space S. The vibrating unit is fixed inside the space S by an adhesive 92 that fixes the motor 90 to the panel holder 30. When the vibrator 91 rotates with the motor 90, vibration is transmitted to the liquid crystal panel 20 via the supporting portion 30a and the liquid crystal panel 20 vibrates. In this way, even when an end surface 20a of the liquid crystal panel 20 is hooked at the supporting portion 30a due to burrs, it is possible to unhook the hooked state. When the hooked state is unhooked, the end surface 20a of the liquid crystal panel 20 is not hindered from moving in a front-to-rear direction (the direction vertical to the screen) on the supporting portion 30a. In this way, even when stress is applied locally to a portion of the liquid crystal panel 20, the stress is removed and the occurrence of brightness unevenness is suppressed.

In the above description, although a configuration of a vibrating unit in which vibration of the vibrator 91 is applied to the end surface 20a of the liquid crystal panel 20 via the supporting portion 30a has been illustrated, the vibrating unit may be configured to apply vibration directly to the end surface 20a of the liquid crystal panel 20. In this case, a hole may be formed in a portion (supporting portion 30a) that the vibrating vibrator 91 makes contact with, of the walls of the panel holder 30 that forms the space S, and the vibrator 91 may make direct contact with the end surface 20a of the liquid crystal panel 20. Alternatively, such a space S as illustrated in FIGS. 3 and 4 may not be provided, and the vibrating unit may be fixed to the supporting portion 30a so that the vibrating unit itself supports the liquid crystal panel 20. In this case, a plurality of vibrating units may be disposed in the supporting portion 30a so that the liquid crystal panel is held horizontally, and a supporting member having the same shape as the vibrating unit and formed from an elastic member or a resin may be disposed in the supporting portion 30a so that the liquid crystal panel is held horizontally. The configuration of the vibrating unit is not limited to the configuration which includes the motor 90 and the vibrator 91. A method of fixing the motor 90 is not limited to the adhesive 92, and other means may be used as long as it can fix the motor 90 to the panel holder 30. In the present embodiment, although an example in which the vibrating unit is provided in the supporting portion 30a that supports the lower end surface of the liquid crystal panel 20, among the sides of the panel holder 30 has been illustrated, the vibrating unit may be disposed in the left and right sides or the upper side of the panel holder 30.

The motor 90 may be controlled so as to be automatically driven when a predetermined condition is satisfied, for example, when the end surface 20a of the liquid crystal panel 20 is hooked at the panel holder 30 and stress is likely to be applied to the liquid crystal panel 20 or when it is necessary to stabilize image quality. For example, the motor 90 is driven immediately before executing a process of performing image calibration to adjust image quality or when performing initial setting after the liquid crystal display apparatus 1 is delivered and received by a user. Moreover, when the liquid crystal display apparatus has a rotatable screen, the motor 90 is driven after the screen is rotated from a lateral orientation to a vertical orientation or from a vertical orientation to a lateral orientation. Rotation of the screen can be detected based on a change in a detection value detected by a tilt sensor that is incorporated into the liquid crystal display apparatus. For example, if the detection value detected by the tilt sensor when the screen is in the lateral orientation is 0°, the motor 90 is driven, for example, when the detection value detected by the tilt sensor is 90°. Further, in order to suppress brightness unevenness on a regular basis, the process of driving the motor 90 may be performed every time by automatic control implemented immediately after an operation of turning on or off the liquid crystal display apparatus 1 is performed.

Figure 5:
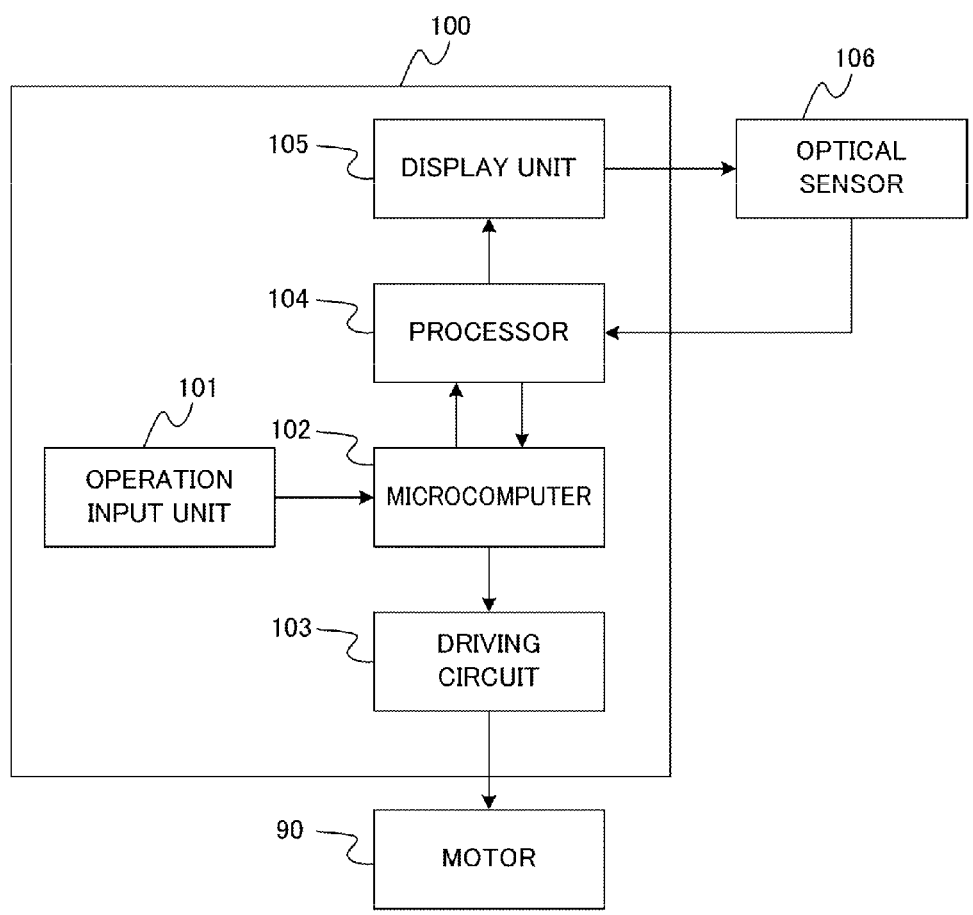
FIG. 5 is a driving block diagram associated with image calibration according to the first embodiment.

Hereinafter, drive control of the motor 90 will be described by way of an example in which the motor 90 is driven when image calibration is performed. FIG. 5 is a functional block diagram of an image display processor 100 of the liquid crystal display apparatus according to the present embodiment. In FIG. 5, an operation input unit 101 receives an operation of a user and transmits an instruction to execute image calibration to a microcomputer 102 according to the user operation. Upon receiving the instruction to execute image calibration from the operation input unit 101, the microcomputer 102 transmits a signal for driving the motor 90 to a driving circuit 103. The driving circuit 103 drives the motor 90 based on the driving signal from the microcomputer 102. In this way, as described above, even when the end surface 20a of the liquid crystal panel 20 is hooked at the supporting portion 30a of the panel holder 30 and a state where stress is applied to the liquid crystal panel is created, the hooked state is unhooked by the vibration applied to the motor 90, and stress is removed. The microcomputer 102 transmits a signal for instructing execution of image calibration to a processor 104. The processor 104 transmits an image to be used for calibration to a display unit 105 and displays the image on the display unit 105. An optical sensor 106 measures brightness or chromaticity of the image displayed on the display unit 105 and transmits the measured value to the processor 104. The display unit 105 includes the liquid crystal panel 20 and the backlight unit 80. In the block diagram of FIG. 5, the flow of signals input from the microcomputer 102 to the display unit 105 is an example, and the present invention is not limited to this.

Figure 6:
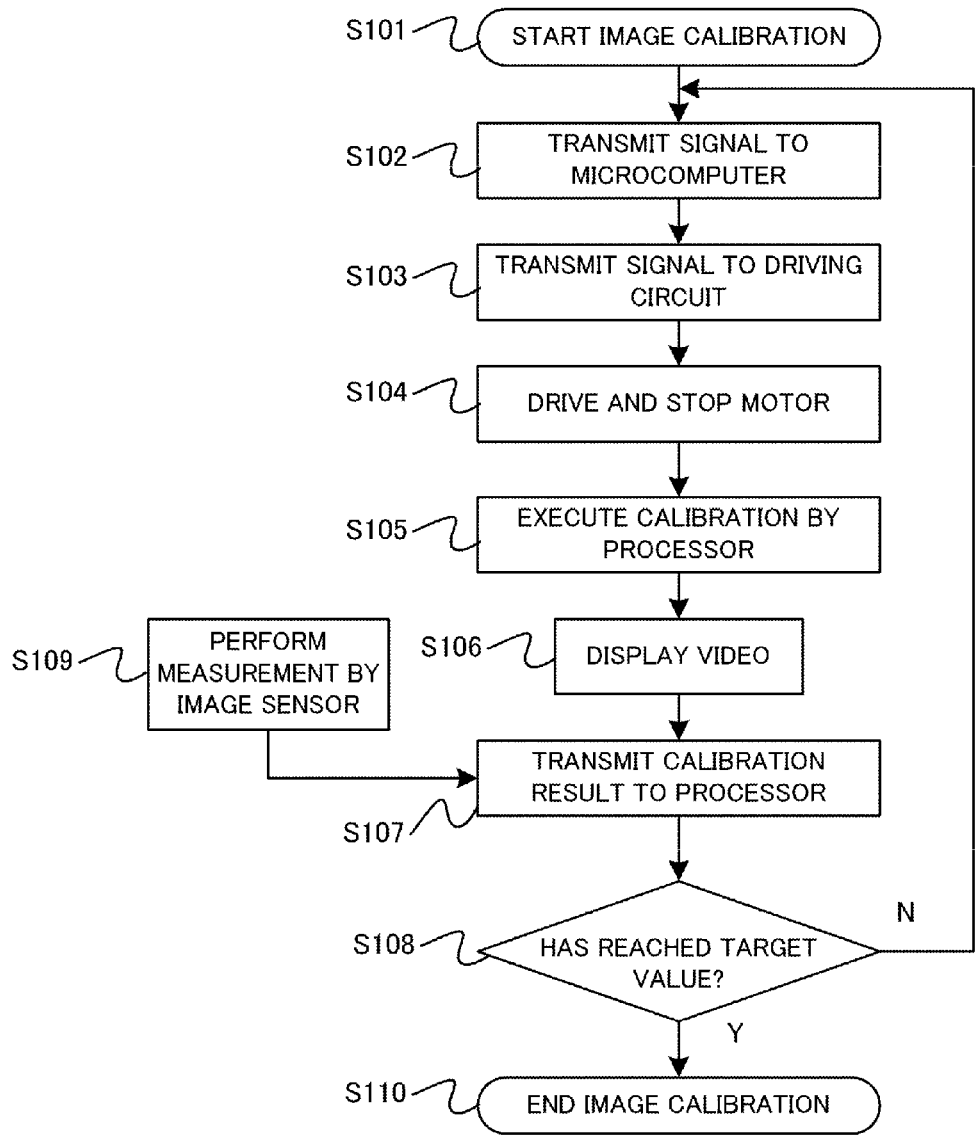
FIG. 6 is a process flowchart associated with image calibration according to the first embodiment.

Next, the operation of the liquid crystal display apparatus 1 according to the present embodiment will be described in detail on the basis of FIG. 6 illustrating a process flow associated with image calibration.

Image calibration is executed when a user performs an operation of instructing to execute image calibration using the operation input unit 101. When image calibration starts (S101), first, a signal indicating the implementation of image calibration is transmitted from the operation input unit 101 to the microcomputer 102 (S102).

In response to this signal, the microcomputer 102 transmits a signal instructing to drive the motor 90 to the driving circuit 103 (S103). According to this signal, the driving circuit 103 controls a revolving speed or a number of revolutions of the motor 90. In response to the signal input from the driving circuit 103, the motor 90 is driven (S104).

When driving of the motor 90 ends, a signal instructing to start image calibration is transmitted from the microcomputer 102 to the processor 104, and the processor 104 performs image calibration (S105). In the image calibration, first, a predetermined calibration image is displayed on the display unit 105 (S106), and the image is measured by the optical sensor 106 (S109). Here, it is assumed that the optical sensor 106 is a sensor that measures brightness which is one of image quality evaluation items of image calibration. The measurement result is transmitted to the processor 104 (S107), and the processor 104 determines whether the measurement result has reached a target value (S108). When the measurement result has reached the target value, the image calibration ends (S110). When the measurement result has not reached the target value, the signal indicating the implementation of image calibration is transmitted again to the microcomputer 102 (S102), and the processes of steps S102 to S108 are repeatedly executed.

Conditions such as a frequency and an amplitude occurring in the vibrator 91 when the motor 90 is driven can be set to optimal conditions appropriately according to the size and weight of the liquid crystal panel. Moreover, a material of a portion of the vibrator 91 making contact with and applying vibration to the supporting portion 30a of the panel holder 30 can be set to an optimal condition appropriately according to the size and weight of the liquid crystal panel.

The present embodiment can be applied to a liquid crystal display apparatus capable of implementing control through change in a backlight brightness according to a characteristic value (brightness or the like) of a displayed image. Alternatively, the present embodiment can be applied to a liquid crystal display apparatus capable of implementing control through change in a backlight brightness (performing local dimming control) according to a characteristic value of a displayed image in each of a plurality of divided areas that forms a display area. In these liquid crystal display apparatuses capable of changing the backlight brightness, it is possible to display a black image darker and to improve the contrast ratio. By applying the present invention to these liquid crystal display apparatuses, it is possible to remove effectively the stress applied to the liquid crystal panel.

Thus, improvement in the contrast ratio resulting from variable control of the backlight brightness is realized more effectively.

(Second Embodiment)

Hereinafter, a second embodiment according to the present invention will be described.

Figure 7:
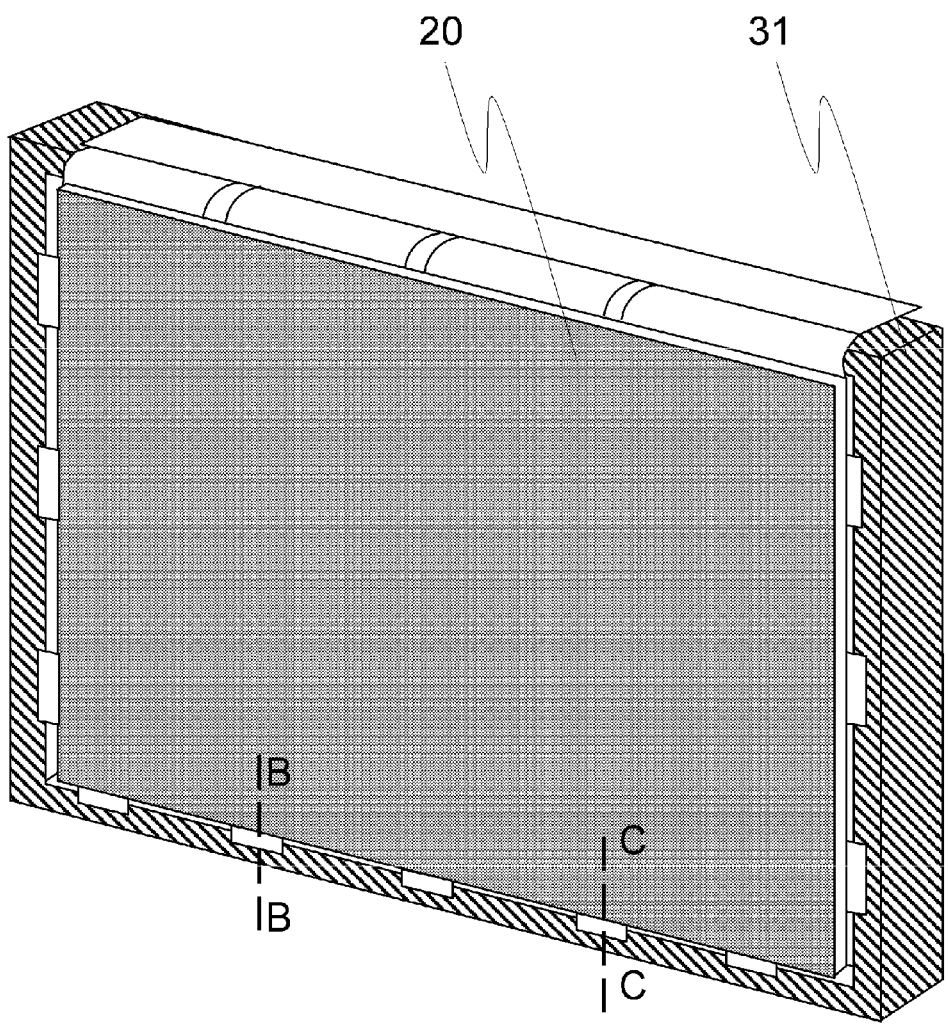
FIG. 7 is a perspective view illustrating a state where a liquid crystal panel according to a second embodiment is incorporated into a backlight unit.

FIG. 7 is a perspective view illustrating a state where the liquid crystal panel 20 of the liquid crystal display apparatus 1 is incorporated into the backlight unit 80, in which a vibrating unit having the same structure as that illustrated in FIG. 3 described in the first embodiment is provided at two positions indicated by the lines B-B and C-C. The number of vibrating units is not limited to two but three or more vibrating units may be provided.

The vibrating unit has the same structure as that illustrated in FIG. 3. Moreover, the block diagram of the image display processor is the same as that illustrated in FIG. 5. In the present embodiment, since the driving circuit 103 and the motor 90 are provided to each vibrating unit, two driving circuits and two motors are provided, which are referred to as first and second driving circuits and first and second motors, respectively.

Figure 8:
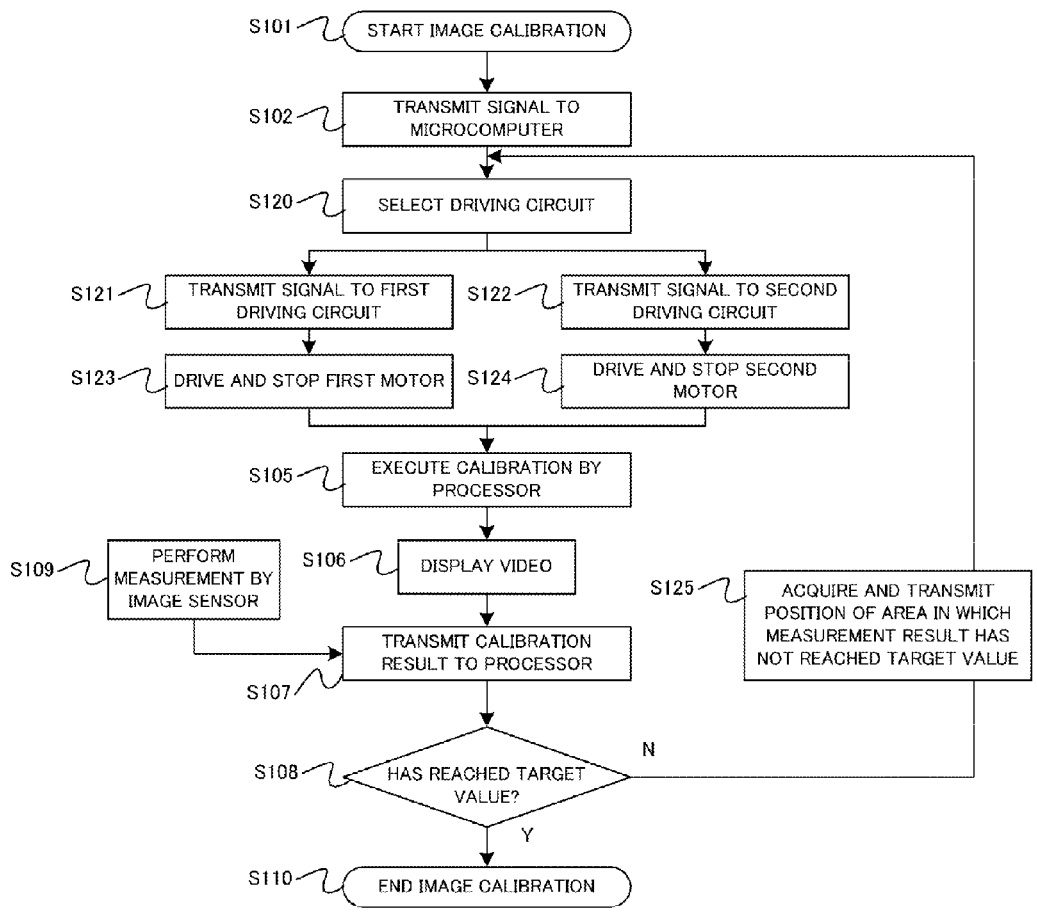
FIG. 8 is a process flowchart associated with image calibration according to the second embodiment.

Next, the operation of the liquid crystal display apparatus according to the present embodiment will be described in detail on the basis of FIG. 8 illustrating a process flow associated with image calibration.

Image calibration is executed when a user performs an operation of instructing to execute image calibration using the operation input unit 101. When image calibration starts (S101), first, a signal indicating the implementation of image calibration is transmitted from the operation input unit 101 to the microcomputer 102 (S102). In response to input of this signal, the microcomputer 102 selects which one of the two driving circuits will be driven (S120).

First, the microcomputer 102 selects the first driving circuit and transmits a signal instructing to drive the first motor to the first driving circuit (S121). According to this signal, the first driving circuit controls a revolving speed or a number of revolutions of the first motor. In response to input of the signal from the first driving circuit, the first motor is driven (S123).

Similarly, the microcomputer 102 selects the second driving circuit and transmits a signal instructing to drive the second motor to the second driving circuit (S122), and the second motor is driven (S124).

When driving of the respective motors ends, a signal instructing to start image calibration is transmitted from the microcomputer 102 to the processor 104, and the processor 104 performs image calibration (S105). In the image calibration, first, a predetermined calibration image is displayed on the display unit 105 (S106), and the image is measured by the optical sensor 106 (S109). Here, it is assumed that the optical sensor 106 is a sensor that measures brightness which is one of image quality evaluation items of image calibration. The measurement result is transmitted to the processor 104 (S107), and the processor 104 determines whether the measurement result has reached a target value (S108). When the measurement result has reached the target value, the image calibration ends (S110). When the measurement result has not reached the target value, the microcomputer 102 acquires information on a position on a screen where the measurement result has not reached the target value with the aid of the processor 104 (S125). The microcomputer 102 selects a driving circuit corresponding to a vibrating unit near the position on the screen where the measurement result has not reached the target value (S120). The microcomputer 102 transmits a signal instructing to drive the motor to the selected driving circuit (S121 or S122). After that, the processes of steps S120 to S108 are repeatedly performed similarly until it is determined in S108 that the measurement result has reached the target value. In this present embodiment, it is assumed that the optical sensor 106 is configured so as to be able to measure the brightness of an image displayed in a plurality of areas within the screen. For example, the optical sensor 106 may include a first sensor that measures brightness at predetermined representative points in a right-side area of the screen and a second sensor that measures brightness at predetermined representative points in a left-side area of the screen and may be configured to output a measurement result in each area of the screen. The microcomputer 102 may compare each of the measurement results obtained by the first and second sensors with a target value, specify a vibrating unit corresponding to an area where the measurement result has not reached the target value, and cause the vibrating unit to vibrate again. In this case, calibration is executed again after the vibrating unit corresponding to an area where the measurement result has not reached the target value is caused to vibrate.

The plurality of motors may be driven at the same point in time and may be driven with a phase shift. The number of revolutions or the revolving speed which is a driving condition of each motor may be the same in all motors and may be different in respective motors. When a plurality of motors is driven at the same time, oscillation occurs and the vibration applied to the liquid crystal panel is amplified although it depends on driving frequency. Thus, the hooked state where the end surface of the liquid crystal panel is hooked at the panel holder can be unhooked more reliably.

(Third Embodiment)

Hereinafter, a third embodiment according to the present invention will be described.

Figure 9:
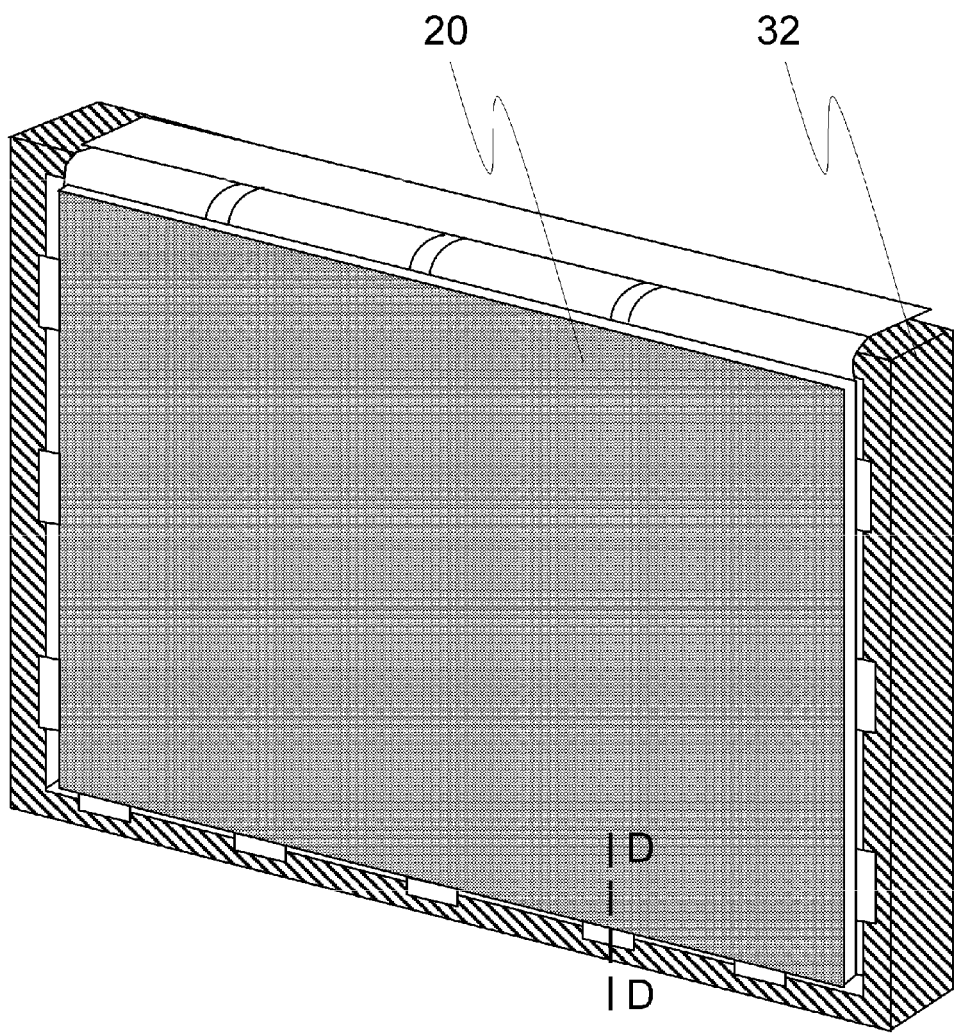
FIG. 9 is a perspective view illustrating a state where a liquid crystal panel according to a third embodiment is incorporated into a backlight unit.
Figure 10:
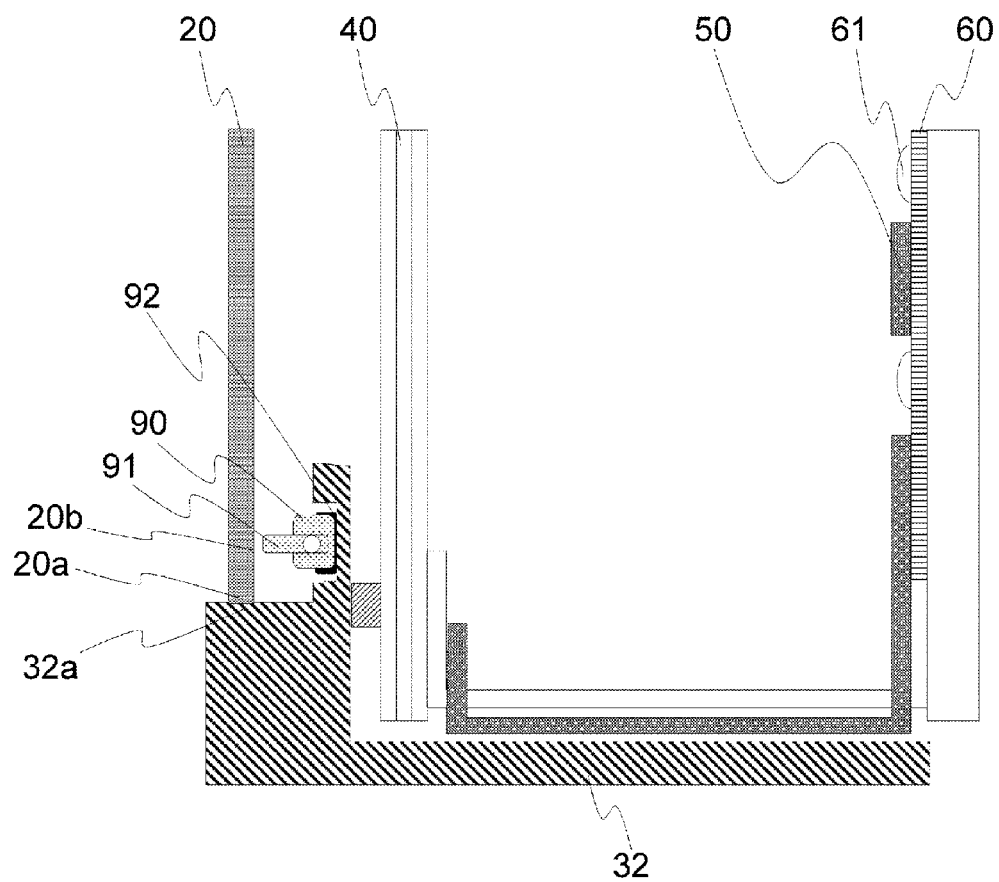
FIG. 10 is a cross-sectional view along line D-D in FIG. 9 of the third embodiment.
Figure 11:
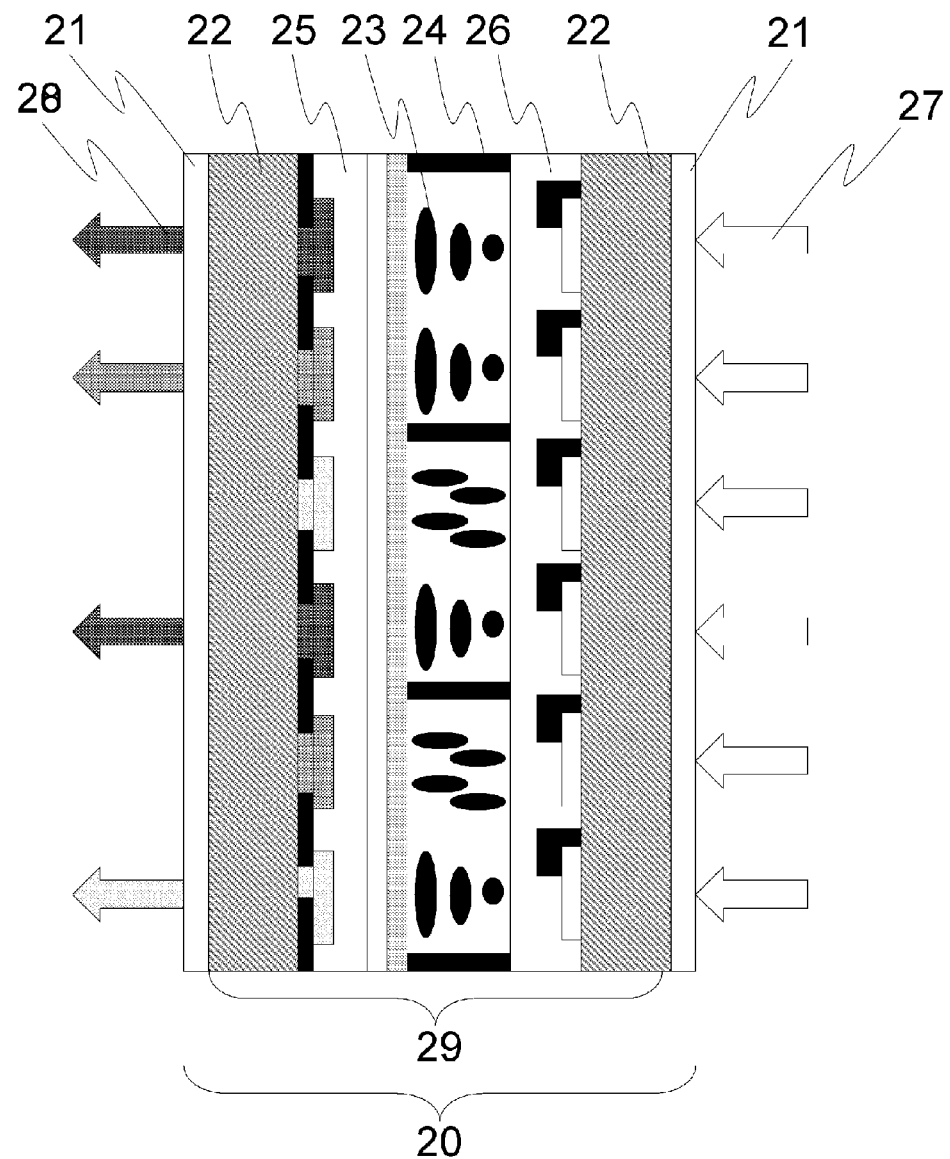
FIG. 11 is a cross-sectional view illustrating an inner structure of a general liquid crystal panel.
Figure 12:
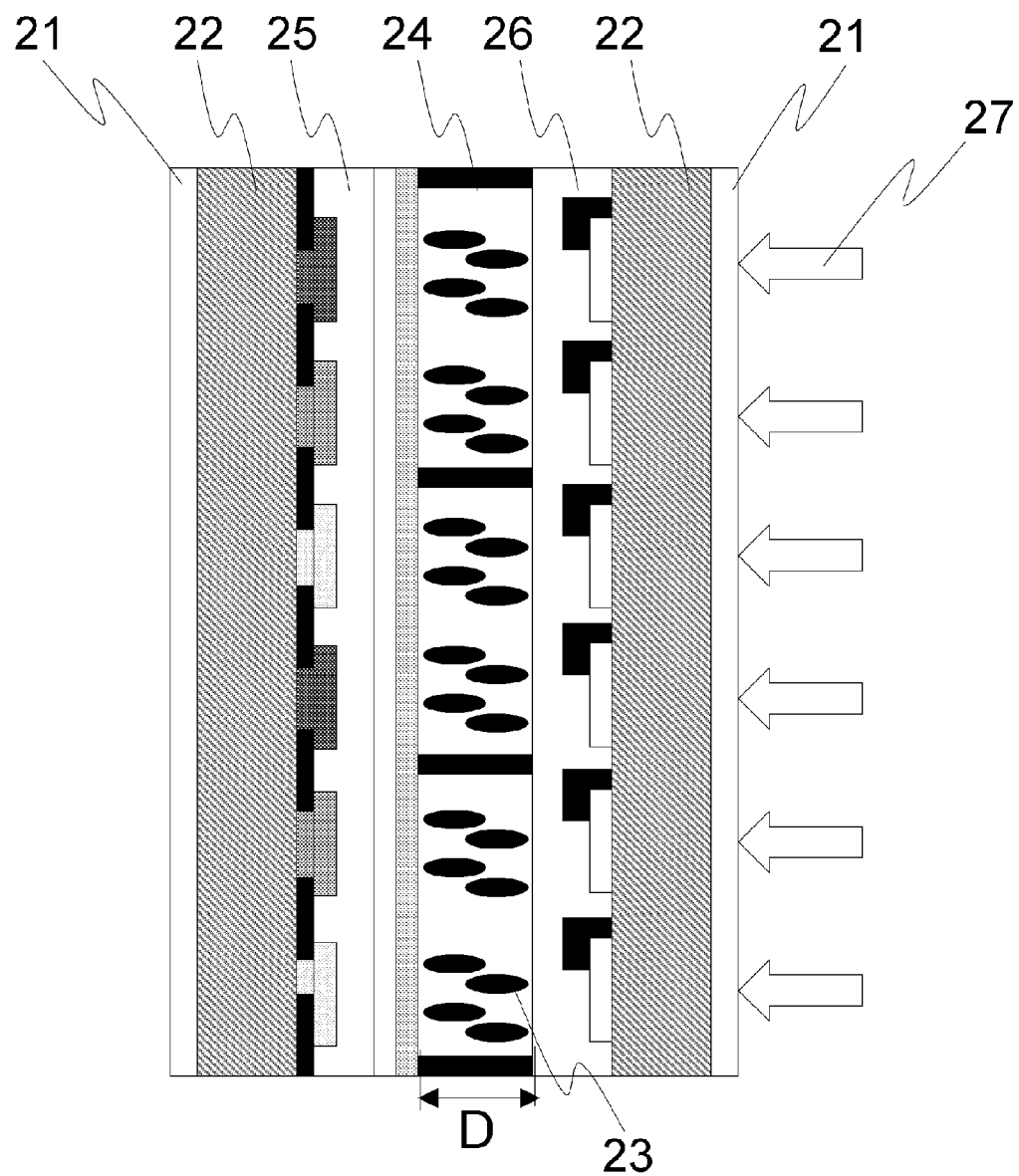
FIG. 12 is a cross-sectional view illustrating an inner structure of a liquid crystal panel when a black image is displayed with no stress applied.
Figure 13:
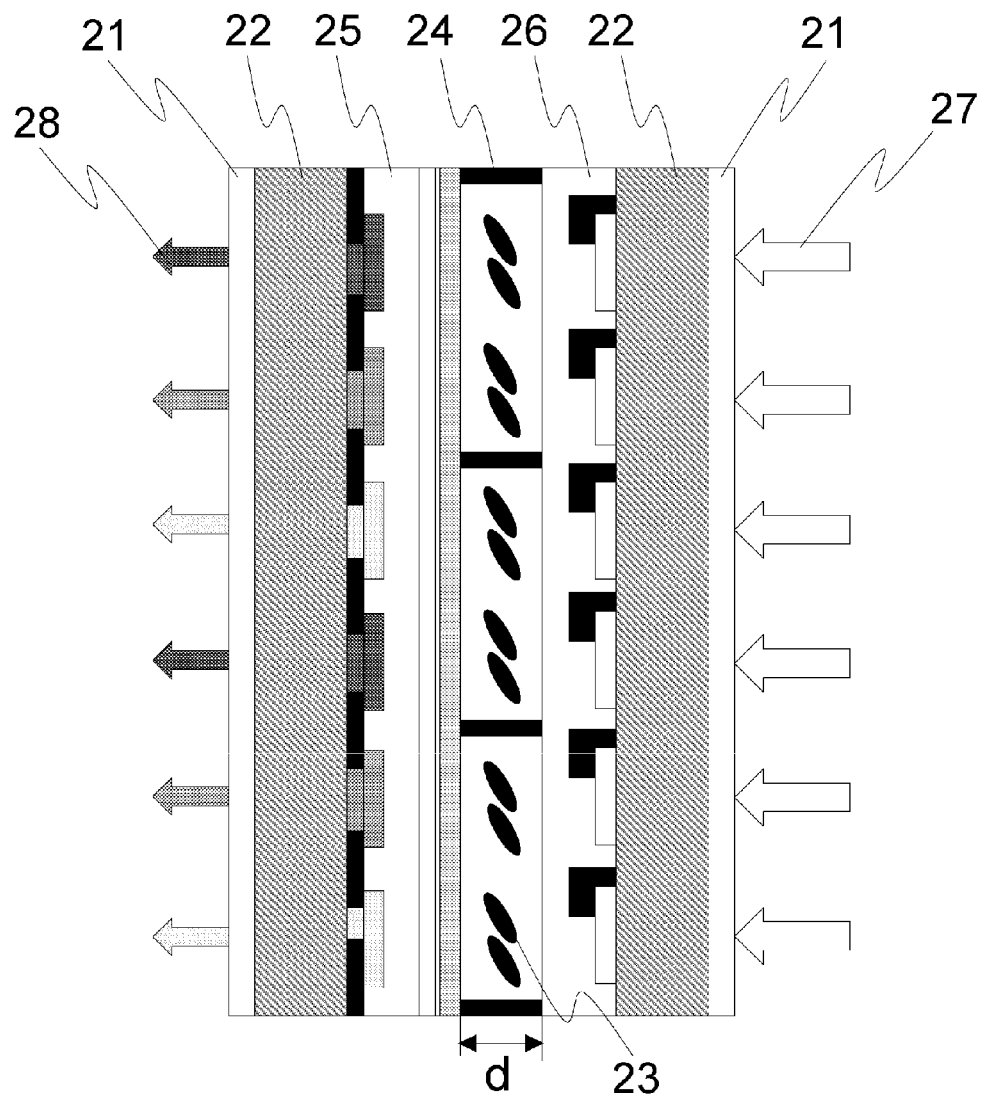
FIG. 13 is a cross-sectional view illustrating an inner structure of a liquid crystal panel when a black image is displayed with stress applied.

FIG. 9 is a perspective view illustrating a state where the liquid crystal panel 20 of the liquid crystal display apparatus 1 is incorporated into the backlight unit 80, and FIG. 10 is a cross-sectional view along line D-D.

As illustrated in FIG. 10, the liquid crystal panel has the end surface 20a being in contact with the supporting portion 32a of the panel holder 32 so that the own weight thereof is supported. The motor 90 and the vibrator 91 that converts driving force of the motor 90 into vibration are disposed near the rear surface 20b of the liquid crystal panel 20 so that the liquid crystal panel 20 is supported from the rear surface side. The motor 90 that drives the vibrator 91 is fixed to the panel holder 32 by the adhesive 92. When the vibrator 91 is rotated with the motor 90, vibration is transmitted to the rear surface 20b of the liquid crystal panel 20 and is transmitted to the liquid crystal panel 20. In this way, even when the end surface 20a of the liquid crystal panel 20 is hooked at the supporting portion 32a due to burrs, it is possible to unhook the hooked state. When the hooked state is unhooked, the end surface 20a of the liquid crystal panel 20 is not hindered from moving in a front-to-rear direction (the direction vertical to the screen) on the supporting portion 32a. In this way, even when stress is locally applied to a portion of the liquid crystal panel 20, the stress is removed and the occurrence of brightness unevenness is suppressed. A method of fixing the motor 90 is not limited to the adhesive 92, and other means may be used as long as it can fix the motor 90 to the panel holder 30.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-230438, filed on Nov. 6, 2013, which is hereby incorporated by reference herein in its entirety.

What is claimed is:

1. A display apparatus comprising:
   a display panel;
   a panel holder having a plurality of supporting portions that make contact with parts of a rear surface of the display panel and an edge of the display panel so as to support the display panel; and
   a vibrating unit provided facing a supporting portion, of the plurality of supporting portions, corresponding to the edge of the display panel so as to apply vibration to at least a portion of the display panel which is in contact with the supporting portion.

2. The display apparatus according to claim 1, wherein the vibrating unit applies vibration to the portion of the display panel which is in contact with the supporting portion, by applying vibration to the supporting portion.

3. The display apparatus according to claim 1, wherein a through-hole is formed in a portion of the supporting portion and the vibrating unit applies vibration directly to the end surface of the edge of the display panel through the through-hole.

4. The display apparatus according to claim 1, wherein the vibrating unit applies vibration in a direction vertical to the end surface of the edge of the display panel and in a direction substantially parallel to a screen of the display panel.

5. The display apparatus according to claim 1, wherein the vibrating unit applies vibration to a rear surface side of the display panel.

6. The display apparatus according to claim 5, wherein the vibrating unit applies vibration in a direction vertical to a screen of the display panel.

7. The display apparatus according to claim 1, wherein the vibrating unit includes a motor and a vibrator that converts driving force of the motor into vibration.

8. The display apparatus according to claim 1, wherein a plurality of vibrating units is arranged at different positions along a direction parallel to the side of the display panel.

9. The display apparatus according to claim 8, further comprising:
   a controller that controls the vibrating unit, wherein
   the controller causes the plurality of vibrating units to vibrate at the same timing.

10. The display apparatus according to claim 8, further comprising:
    a controller that controls the vibrating unit, wherein
    the controller causes the plurality of vibrating units to vibrate at different timing.

11. The display apparatus according to claim 1, further comprising:
    a controller that controls the vibrating unit; and
    an operation input unit that receives input of an operation from a user, wherein
    the controller causes the vibrating unit to vibrate in a case where the user performs an operation of inputting an instruction to vibrate the vibrating unit using the operation input unit.

12. The display apparatus according to claim 1, further comprising:
    a controller that controls the vibrating unit, wherein
    the controller causes the vibrating unit to vibrate in a case where a predetermined condition is satisfied.

13. The display apparatus according to claim 12, further comprising:
    a calibrating unit that executes calibration of the display panel, wherein
    the controller causes the vibrating unit to vibrate before the calibrating unit executes the calibration.

14. The display apparatus according to claim 13, further comprising:
    a sensor that detects brightness or chromaticity of the display panel; and
    a determining unit that determines whether a detection value detected by the sensor has reached a target value after the calibration is executed, wherein
    the controller causes the vibrating unit to vibrate again and then causes the calibrating unit to execute the calibration in a case where the determining unit determines that the detection value detected by the sensor has not reached the target value.

15. The display apparatus according to claim 14, wherein the determining unit divides a display area of the display panel into a plurality of areas and determines, for each of the plurality of areas, whether the detection value detected by the sensor has reached the target value, and
    the controller causes the vibrating unit disposed near an area, in which the determining unit has determined that the detection value detected by the sensor has not reached the target value, to vibrate and then causes the calibrating unit to execute the calibration.

16. The display apparatus according to claim 12, wherein the display panel is configured to be rotatable,
    the display apparatus further includes a detector that detects rotation of the display panel, and the controller causes the vibrating unit to vibrate in a case where the detector has detected the rotation of the display panel.

17. The display apparatus according to claim 12, wherein the controller causes the vibrating unit to vibrate immediately after an operation of turning on or off the display apparatus is performed.

18. A method of controlling a display apparatus including:
a display panel;
a panel holder having a plurality of supporting portions that make contact with parts of a rear surface of the display panel and an edge of the display panel so as to support the display panel; and
a vibrating unit provided facing a supporting portion, of the plurality of supporting portions, corresponding to the edge of the display panel so as to apply vibration to at least a portion of the display panel which is in contact with the supporting portion,
the method comprising:
controlling the vibrating unit; and
determining whether a predetermined condition is satisfied, wherein
the controlling involves causing the vibrating unit to vibrate in a case where the predetermined condition is satisfied.

19. The method of controlling a display apparatus according to claim 18, further comprising:
executing calibration of the display panel, wherein
the controlling involves causing the vibrating unit to vibrate before the calibration is executed.

20. The display apparatus according to claim 1, wherein the plurality of supporting portions support at least a part of the rear surface of a lower edge of the display panel.

* * * * *